United States Patent [19]

Patton et al.

[11] Patent Number: 5,059,629

[45] Date of Patent: * Oct. 22, 1991

[54] BIOCIDAL FOAMS

[75] Inventors: Robert T. Patton; Walter L. Vaughn, both of Lake Jackson; Thomas J. McKeand, Jr., Clute, all of Tex.

[73] Assignee: The Dow Chemical Company, Midland, Mich.

[*] Notice: The portion of the term of this patent subsequent to Apr. 2, 2008 has been disclaimed.

[21] Appl. No.: 675,369

[22] Filed: Mar. 25, 1991

Related U.S. Application Data

[62] Division of Ser. No. 481,913, Feb. 16, 1990, Pat. No. 5,004,760.

[51] Int. Cl.$^5$ .......................... C08J 9/14; A61K 31/74

[52] U.S. Cl. ..................... 521/84.1; 424/70; 424/81; 424/400; 424/405; 521/70; 521/109.1; 521/134; 521/136; 521/137; 521/139; 521/149

[58] Field of Search ..................... 521/70, 84.1, 109.1, 521/134, 136, 137, 139, 149

[56] References Cited

U.S. PATENT DOCUMENTS 5,004,760  4/1991  Patton ................................. 521/149

Primary Examiner—Morton Foelak

[57] ABSTRACT

A biocidal foam product comprising a foam having incorporated therein a water insoluble thermoplastic copolymer consisting of an alpha olefin and an alpha, beta-ethylenically unsaturated carboxylic acid, said copolymer having at least one biocidal agent ionically bonded to said copolymer.

3 Claims, No Drawings

BIOCIDAL FOAMS

CROSS-REFERENCE TO RELATED APPLICATION

This is a divisional of application Ser. No. 07/481,913, filed Feb. 16, 1990, now U.S. Pat. No. 5,004,760.

RELATED APPLICATIONS

This application is related to copending application Ser. No. 433,488, filed Nov. 8, 1989 of Vaughn et al entitled "Biocidal Fluid Filters".

FIELD OF THE INVENTION

The invention relates to polymeric foams which are resistant to biological attacks, are biocidal and/or have improved strength. More particularly, the invention provides a means for preparing polyolefin resin, polystyrene, latex, urea, cellulosic, isocyanurate and polyurethane foam structures, or the like, so as to be resistant to biological attacks, are biocidal, and in some instances, are reinforced.

BACKGROUND OF THE INVENTION

The physical and mechanical properties of foams make them useful for a wide variety of applications. Flexible foams have been used in fabricating diapers, mop heads, sponges, and the like. More rigid and higher density foams have been used for bedding, for example mattresses also been used as replacement for wood. In each of the fields of use the foams have been susceptible to biological attack and mechanical abuse.

It is well known that diapers, mop heads, mattresses, and the like, are utilized under conditions wherein the foams are subjected to microorganisms which cause odors, degrade the foam or result in an unsanitary condition. Rigid foams are commonly used outdoors or at locations which promote growth of fungus and/or mold that degrade the foams or render them unattractive.

There are many antimicrobial preparations for suppressing mold, mildew and odor-causing bacteria. Such preparations include solid biocide concentrates as described in U.S. Pat. No. 4,086,297. The commercial preparation of Morton Thiokol, Inc. sold under the trademark VINYZENE is an additive to plastics which comprises 10, 10$^1$-oxybisphenozas that is active against a broad spectrum of fungi and bacteria. The product is in the form of a 2 weight percent solution in mineral spirits or methyl ethyl ketone and as a 5 weight percent blend in a thermoplastic resin. These products are used as biocides in the field of wood preservatives, swimming pools, food preservatives, sanitizers and disinfectants, industrial water treatment and plastics.

Biocides which are commercially available include active halogens, for example chlorine, chlorinated isocyanurates, halophors and the like, phenolics, quaternary ammonium salts including alkylbenzyl dimethylammonium chloride, where the alkyl group contains 12–18 carbon atoms and dimethyldialkylammonium chloride, where the alkyl group contains 8–10 carbon atoms.

These biocides however are leachable and can be lost in an aqueous environment.

There is a further need to provide some foams with reinforcement. It is common to provide high-density polyurethane foams with fiber reinforcement, such as fiberglass, wollastonite, etc. These reinforcing fibers are added together with fillers which include biocides, deodorizing agents and the like. The problem encountered in such cases is that the addition of fillers alters the physical characteristics of the foam.

U.S. Pat. No. 4,680,214 to Frisch et al, which is herein incorporated by reference, discloses a rigid polyurethane foam having suspended therein fillers and reinforcing fibers. The fibers comprise fiber glass or yarn strands which are near the surface.

U.S. Pat. No. 3,865,619 to Pennewiss et al discloses the preparation of anti-fogging hydrophilic resin coatings of an ethylenically unsaturated monomer, an acrylic acid or methacrylic acid and a quaternary ammonium salt. The quaternary ammonium salt is not biocidal.

U.S. Pat. Nos. 3,437,718 and 3,970,626, which are herewith incorporated by reference disclose suitable methods for preparing the precursor ionomers which may be used in the present invention.

U.S. Pat. No. 4,661,634 to Vaughn et al which is herein incorporated by reference, discloses the use of particles and fibers for removing impurities from quaternary ammonium salts.

The particles and fibers of Vaughn et al comprise an alpha olefin copolymerized with an olefinically unsaturated carboxylic acid which forms a "quat acrylate copolymer" when combined with quaternary ammonium salts.

Application Ser. No. 157,202 filed Feb. 17, 1988 of Patton et al entitled, "Polymer Salt Complex for Fiber or Fabric Treatment", which is herein incorporated by reference, discloses fabrics coated with copolymers of alpha olefins and beta-ethylenically unsaturated carboxylic acids that are modified with quaternary ammonium salts.

U.S. Pat. No. 4,837,079 to Quantrille et al discloses an antimicrobially active non-wooly web of cellulosic fibers bonded with a polymeric binder and having polyhexamethylene liquanide hydrochloride substantive to the fibers and bind as the antimicrobial agent.

U.S Pat. No. 3,872,128 to Byck discloses an antimicrobial composition of carboxyl-containing alpha-olefin polymers which have been partially neutralized with quinoline or pyridine derivatives. However, hydrogels are not disclosed. The patent uses a melt process, a diffusion process and a dispersion process for preparing the antimicrobial compositions. In the melt process the reactants are refluxed with the removal of water. In the diffusion and dispersion processes the copolymer is stirred with a sodium hydroxide solution, treated with the antimicrobial agent and then treated with an acid. The acid prevents the formation of a hydrogel.

The article of Ackart et al entitled "Antimicrobial Polymers", *J. Bromed. Mater. Res.*, Vol. 9, pp 55–68 (1975) discloses carboxy-containing alpha olefin copolymers having antimicrobial activity which are prepared to processes similar to those utilized in the aforementioned U.S. Pat. No. 3,872,128. The study eliminated the antimicrobial ionomers from consideration in applications such as surface treatments for hospital rooms, protective beds, pillow coverings, etc. The major area of use was in products intended to protect the article itself from microbial attack.

It should be understood that there is a distinction between the hydrogels of the invention which retain water and have the cationic biocide ionically bonded to the copolymer, and a copolymer which is merely swollen and then treated with a cationic biocidal agent without forming a hydrogel. In the hydrogel formation with the biocidal agent there are many carboxylic acid sites available for bonding.

The hydrogel is formed when the solution of cationic biocidal agent contacts the copolymer which is swollen with the base and water remains. Contacting the swollen copolymer or hydrogel with an acidic solution or refluxing off the water during ionic bonding prevents the hydrogel from forming.

SUMMARY OF THE INVENTION

The present invention relates to polymeric foams which are resistant to biological attacks, are biocidal and/or have been improved by incorporating therein fillers comprising particles or fibers of an ionomer or copolymer of an alpha-olefin having the general formula R—CH=CH$_2$ where R is selected from the group consisting of hydrogen and alkyl radicals having from 1 to 8 carbon atoms, and an alpha, beta-ethylenically unsaturated carboxylic acid which has been modified by at least one cationic biocidal agent ionically bonded therewith. The acid monomer content of the copolymer is preferably from about 5 to 50 mol percent based on the copolymer.

Advantageously, the biocidal copolymer is a hydrogel. Preferably, the biocidal groups are uniformly distributed throughout the copolymer. Generally, when the copolymer is not a hydrogel the biocidal groups are found only on the surface of the copolymer. Utilizing microporous or cellular copolymers or particles provides a greater surface area to contact the microorganisms and to carry the biocidal agent. However, hydrogels carry a greater amount of the biocidal agents.

The cationic biocidal agents which are capable of being ionically bonded with the copolymers of the invention to form the biocidal particles and fibers include (CH$_3$O)—Si—CH$_2$—R—N—R R' X, wherein R is lower alkyl, R' is an alkyl of 16 to 25 carbon atoms and X is a halide, monoalkyltrimethyl ammonium salts such as cetyltrimethyl ammonium bromide (CTAB), alkyltrimethyl ammonium chloride (commercial available as ARQUAD 16), monoalkyldimethyl benzyl ammonium salts which are commercially available as BTC 824, HYAMINE 3500, and RISEPTIN (dodecyldimethyl-3,4-dischlorobenzyl ammonium chloride), dialkyldimethyl ammonium salts, heteroaromatic ammonium salts such as cetylpyridium halide, alkylisoquinolinium bromide, bis-quaternary salts such as 1,10-bis ( 2-methyl-4-amino-quinolinium chloride)-decane, polymeric quaternary ammonium salts such as poly[oxyethylene (dimethylimino) ethylene (dimethyliminio)-ethylenedichloride], 2-(4-thiozolyl) benzimidazole, N[alpha(1-nitroethyl)benzyl]ethylenediamine, 6-chloro-9[4-diethylamino-1-methylbutyl amino]-2-methoxy acridine dihydrochloride, and the like.

The preferred biocidal agents used in modifying the copolymer and ionomer used in the invention are selected from the group consisting of alkylbenzyldimethyldialkylammonium halide, wherein the alkyl group contains 8-10 carbon atoms, and dimethydialkylammonium halide, wherein the alkyl group contains 12 to 18 carbon atoms. Advantageously, the biocidal agent forms about 30-50% by weight of the reaction product.

The biocidal agent modified copolymers and ionomers of the invention can be prepared by reacting an ionomer or copolymer with a suitable biocide by milling, melt blending, slurrying the polymer with a solution of the biocidal agent of the invention or by passing an alkaline solution of the biocidal agent through a fabricated article of the ionomer or copolymer. Preferably, the ionomer or copolymer is made into a hydrogel by being treated with the biocidal agent.

The copolymer or ionomer may be blended with other thermoplastic materials prior to reaction with the biocidal agent to provide a fiber or particle characteristic for use in a specific environment.

Suitable thermoplastic materials include polyolefins, for example, polyethylene, polypropylene, and the like, polyvinyl chloride, polyvinyl acetate, polyvinylidene chloride, and the like.

Since the biocidal copolymers or ionomers of the invention are capable of killing on contact a broad spectrum of microorganisms, yeasts, fungi and molds, they provide foams in which they are incorporated with sanitizing and deodorizing characteristics. However, when the modified copolymer is in fiber form, it is capable of providing reinforcement so that other reinforcing agents need not be added.

The modified copolymer may be utilized in an amount of about 5 to 50% by weight of the total composition depending upon the particular foam and whether or not the copolymer comprises particles or fibers.

It is understood that the term particle is meant to include fine particles, powders, platelets and the like. The fibers may be short or long strands. A combination of the various forms may also be utilized.

Also, the term "copolymer" as used herein is meant to include ionomers, partially neutralized ionomers and copolymers having substantially all carboxylic acid groups available for ionically bonding with a biocidal agent.

DESCRIPTION OF THE PREFERRED EMBODIMENTS

In accordance with the present invention a foam is provided having incorporated therein particles and/or fibers of a copolymer comprised of an alpha olefin and an alpha, beta-ethylenically unsaturated carboxylic acid or an ionomer of said copolymer which is reacted with a cationic biocidal agent capable of forming an ionic bond therewith. In accordance with a preferred embodiment of the invention, the biocidal agent is a quaternary ammonium salt selected from the group consisting of alkylbenzyldimethylammonium halide, wherein the alkyl group contains 12 to 18 carbon atoms and dimethyldialkylammonium halide, wherein the alkyl group contains 8 to 10 carbon atoms. Preferable of the quaternary ammonium salts is dimethyldidecyl ammonium chloride.

Examples of suitable olefins include ethylene, propylene, butene-1, pentane 1, hexane-1, heptane-1, 3-methylbutene, pentane-1, and the like.

Examples of suitable acid monomers include acrylic acid, methacrylic acid, ethacrylic acid, itaconic acid, maleic acid, fumaric acid, and maleic anhydide. Maleic anlydide is not a carboxylic acid but it can be considered an acid for the purpose of the invention because its reactivity is that of an acid. Similarly, other monoethylenically unsaturated anhydrides of carboxylic acid can be used.

The copolymer base need not necessarily comprise a two component polymer. Thus, although the olefin content of the copolymer should be at least 50 mol percent, more than one olefin can be employed to provide the hydrocarbon nature of the copolymer base. Additionally, other copolymerizable monoethylenically unsaturated monomers, illustrative members of which are mentioned below in this paragraph, can be employed in combination with the olefin and the carboxylic acid comonomer. The scope of base copolymers suitable for use in the present invention is illustrated by the following examples: ethylene/acrylic acid/carbon monoxide copolymers, ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/ethylacrylate copolymers, ethylene/itaconic acid/methyl methacrylate copolymers, ethylene/methyl hydrogen maleate/ethyl acrylate copolymers, ethylene/methacrylic acid/ vinyl acetate copolymers, ethylene/acrylic acid/vinyl alcohol copolymers, ethylene/propylene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinylidene chloride/acrylic acid copolymers, ethylene/vinyl fluoride/methacrylic acid copolymers, and ethylene/chlorotrifluoroethylene/methacrylic acid copolymers.

The copolymers may also, after polymerization but prior to ionic crosslinking, be further modified by various reactions to result in polymer modifications which do not interfere with the ionic crosslinking. Halogenation of an olefin acid copolymer is an example of such polymer modification.

The preferred base copolymers, however, are those obtained by the direct copolymerization of ethylene with a carboxylic acid comonomer. Such copolymers, when converted to hydrogels, provide unexpected advantages.

The ionic copolymers are obtained by the reaction of the acid copolymer with a suitable base or an ionizable basic metal compound which is well known and referred to as neutralization. The ionomers are those in which at least 5 percent by weight, preferably from about 20 to about 100 percent by weight of the acid groups have been neutralized. Metal ions which are suitable for neutralizing the copolymers of the present invention are selected to make porous particles from monovalent, divalent and trivalent metals of Groups I, II, IV-A, and VIII of the Periodic Table of Elements. Specific examples of suitable monovalent metal ions are selected from $Na^+$, $K^+$, $Li^+$, $Cs^+$, $Rb^+$, $Hg^+$, and $Cu^+$. Examples of suitable divalent ions include $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$, and $Zn^{+2}$. Trivalent metal ions suitable for use herein are selected from the group of $Al^{+3}$, $Sc^{+3}$, $Fe^{+3}$, and $Y^{+3}$. However, in making hydrogels of the ionomer particles by reaction with a quaternary amine, ionomers of monovalent or divalent should be used.

The preferred metals suitable for neutralizing the copolymers used herein are the alkali metals of Group I, particularly cations such as sodium, lithium, potassium, and alkaline earth metals of Group II, in particular, cations such as calcium, magnesium, and zinc. It should be noted that more than one metal ion may be incorporated into the copolymer in certain applications. Suitable bases for neutralizing the carboxylic acid groups include, inter alia, ammonia, amines, alkali metal hydroxides, alkaline earth metal hydroxides, other metal hydroxides, metal oxides and the like.

A convenient method of preparing ionomers is disclosed in U.S. Pat. No. 3,437,718, issued to Rees, entitled, "Polymer Blends". In particular, the metal compound is added to an alpha-olefin/alpha, beta-ethylenically unsaturated carboxylic acid and the mixture is milled at a temperature of from about 140° to about 180° C. for about 15 minutes or until the reaction proceeds to completion. The disclosure of U.S. Pat. No. 3,437,718 is incorporated herein by reference.

Another method of preparing the alkali metal salts of copolymers herein is disclosed in U.S. Pat. No. 3,970,626, issued to Hurst et al, on July 20, 1976; the disclosure of which is incorporated herein by reference. In particular, the reference teaches a hydrolysis process for preparing aqueous copolymer salt emulsions of alpha olefin, alpha, beta-ethylenically unsaturated carboxylic acids by suspending a particular alpha-olefin, alpha beta-ethylenically unsaturated carboxylic acid ester interpolymer in water having an alkali metal dissolved therein and heating said mixture to a temperature of at least 180° C. under autogenous pressure for a period of time sufficient to enable the alkali metal to react with a sufficient portion of the ester groups of the copolymer to render said copolymer emulsifiable in the aqueous alkali medium.

According to the present invention the copolymer or ionomer is first formed into the pertinent structure, that is, fibers, particles, etc. The copolymer or ionomer is treated with a base and then ionically bonded with a biocidal agent. The reaction which takes place is a replacement reaction wherein the metal group of the ionic polymer is displaced by the biocidal agent. Preferably, the acid copolymer is reacted with a base to form an ionomer and the quaternary ammonium compound and/or other biocidal agent is then ionically bonded to the copolymer thus producing a hydrogel. With a hydrogel there is a greater distribution of the biocidal agent throughout the copolymer.

More specifically, a fabricated article is swollen/digested with a hot (50°-70° C.) aqueous base (such as 2.0 wt. % sodium hydroxide) to form a porous ionomer. The excess caustic is rinsed away with deionized water and then the swollen/digested polymer is treated with an aqueous solution containing the cationic biocidal agent (for example, a quaternary salt). The biocidal agent is becomes ionically bonded (interchanged for sodium which is released into the solution), thus producing a hydrogel.

The biocidal polymer is preferably washed with deionized water to remove any labile or unreacted salts. The necessity of this step depends on the intended uses of the product.

Alternatively, ethylene-acrylic acid copolymers (or an equivalent) is extruded (85°-88° C.) into a strand alone or blended with another thermoplastic with some orientation (including "cold-drawing" the strand at a temperature below that at which stress relaxation can occur) prior to chopping the strand into strand chopped pellets. The pellets are swollen for 2-5 hours in 2.0 wt. % sodium hydroxide aqueous solution at a temperature of 50°-65° C. to induce conversion to the ethylene-sodium acrylate ionomer (ion exchange thermoplastic pellet). The caustic is drained, the pellets are washed with deionized water and hammered into fiber using a hammermill. The resulting fiber are water washed and sized by pumping an aqueous slurry of the hammered fiber through screens of different mesh. Generally it is desirable to separate the fibers of 50 mesh and smaller from those of a coarser size.

Alternatively, ethylene-acrylic acid copolymers (or an equivalent) is extruded (185°-190° F.) into a strand with some orientation (including cold drawing the strand at a temperature below that at which stress relaxation can occur) prior to chopping the strand into strand chopped pellets. The pellets are swollen for 2-5 hours in 2.0 wt. % sodium hydroxide aqueous solution at a temperature of 50°-65° C. to induce conversion to the ethylene-sodium acrylate ionomer (ion exchange thermoplastic pellet). The caustic is drained, the pellets are washed with deionized water, treated with an aqueous solution of the cationic biocidal agent and then hammered into fiber, i.e. fibrillated, using a hammermill. The resulting fibers are water washed and sized by pumping an aqueous slurry of the hammered fibers through screens of different mesh. Generally it is desirable to separate the fibers of 50 mesh and smaller from those of a coarser size. The coarse fiber (18-50 mesh) are suitable for use in rigid foam structures while the fine fiber (>50 mesh) is suitable for example in mattresses.

PREPARATION OF FOAM

The foams which may be utilized in the invention may be formulated so as to be flexible, semi-rigid or rigid in nature. The foams of the invention can take the form of pellets, coatings, pads, seat pads, cases, structural material, and the like.

The polyurethane foams employed in the present invention are preferably prepared from a polyol reactant, which is mixed with an aqueous polyisocyanurate reactant. The foams thus generated are characterized by a crosslinked molecular network.

The polyol is reacted with a polyisocyanate in a convention manner together with the biocidal fibers and/or particles of the invention. The reaction can be carried out in an inert atmosphere, such as under a nitrogen blanket, at atmospheric pressure and at a temperature in the range of about 0° Celsius to about 120° Celsius for a period of time ranging up to about 20 hours, depending upon the temperature and the degree to which the reaction mixture is agitated. The reaction can also be carried out under ambient conditions.

The reaction is effected using stoichiometric amounts of reactants. It is desirable, however, in some cases to use an excess of polyisocyanate in order to insure complete reaction of the polyol. The ratio of isocyanate groups to hydroxyl groups is generally between about 1 to about 4 isocyanate groups per hydroxyl group.

The polyisocyanates employed in the reaction may include a polyaryl polymethylene polyisocyanate as defined in U.S. Pat. No. 2,683,730, for example, benzene 1,3,5-triisocyanate; chlorophenyl diisocyanate; 3,3'-dimethoxy-4,4'biphenylenediisocyanate, and the like.

Readily available aromatic diisocyanate, aliphatic and cycloaliphatic diisocyanates and polyisocyanates or mixtures thereof, having a high degree of activity, are suitable for use in the reaction.

Polystyrene foams used in the invention may be prepared by conventional methods while incorporating therein the biocidal fibers and/or particles of the invention.

Presently known techniques of preparing expanded polystyrene include the extrusion of a thermoplastic resinous gel in admixture with a volatile raising or blowing agent into a region of lower pressure where the volatile raising agent vaporizes and forms a plurality of gas cells within the extruded gel. The extruded foamed gel is subsequently cooled to form a self-supporting cellular foamed body. A wide variety of foaming or raising agents are known. These foaming or raising agents primarily fall into the class of aliphatic hydrocarbons such as butane, hexane, heptane, pentanes and the like, as well as gases which are soluble in a polymer under pressure such as carbon dioxide.

Beneficially, certain fluorinated hydrocarbons are used such as trichlorofluoromethane, trifluoromethane and the like, as well as chlorohydrocarbons such as methylene chloride. Many of these raising agents are found to be satisfactory with various polymeric materials.

The following examples are illustrative of the invention, but are not to be construed as to limiting the scope thereof in any manner. The percentages disclosed relate to percentage by weight.

EXAMPLE 1

A. Preparation of Biocidal Fiber from Melt Spun Ethylene/Acrylic Acid Copolymer

An ethylene/acrylic acid copolymer (melt index of 300 and acrylic acid content of 20 wt. %) was melt spun at 147° C. on fiber spinning equipment used for polyethylene spinning (spinnerette with 34 holes of 600 microns diameter). The copolymer was spun into a continuous filament and hauled off onto spools during spinning. A filament of 26-28 micron diameter was spun.

A six gram sample of the filament was chopped to 6 mm. length mechanically. The chopped fiber was placed in a stirred beaker containing an excess of 0.5 N NaOH solution. The mixture was digested for 5 hours at 55° C. to convert the fiber to a microporous, wettable fiber of ethylene-sodium acrylate. The solution was cooled. The caustic was drained and the fiber was washed with water to remove excess caustic.

The swollen fiber was diluted in water to form a slurry and poured into a 100 ml. burette and the excess water drained. A 500 ml. solution of 5.0 wt. % of dimethyldidecylammonium chloride was slowly recirculated through the fibrous bed continuously at a flow rate of thirty bed volumes per hour flow rate using a masterflex variable speed peristaltic pump. After a six hour exposure time, distilled water was purged through the column to clean the fibers thoroughly (1.5 liters of purge water). The fibers were removed from the burette and air dried. A nitrogen analysis showed the new product to have 1.03 wt. % nitrogen (corresponding to 26.5 wt. % of dimethyldidecylammonium acrylate, about a 34% conversion to the biocidal quat form). Sodium analysis of the fiber (before and after treatment) showed that the residual sodium was reduced from 4.2 wt. % to 21 ppm. (99.95% replacement of available sodium with the dimethyldidecylammonium cation).

B. Samples of the above melt spun ethylene-acrylic acid dimethyldidecylammonium acrylate were submitted to a Biolab for testing. Four types of microorganisms were tested (petri dish tests containing agar and a few fibers were inoculated with microorganisms to determine if the organisms would form colonies or die). Complete kill was observed for the four organisms tested (mucor miehei, candida albicans, pircicula riacryzac, aspergillis niger). The fiber definitely exhibited biocidal properties and the dimethyldidecylammonium acrylate groups were linked to the biocidal properties. The fibers could be placed in a sponge or sponge mop. The biocidal fibers were also effective against pseudomonas aeruginosa, brewers yeast, E. coli and S. aureus.

EXAMPLE 2

A. Preparation of Biocidal Fiber from Melt Blown Ethylene Acrylic Acid

An ethylene/acrylic acid copolymer (melt index of 300 and acrylic acid (A.A.) content of 20 wt. %) was melt blown at 147 degrees Celsius and blown in high speed air into a mass. The diameter was 30 microns for this melt blown filament.

A six gram sample of the melt blown filament was chopped to 5 mm lengths mechanically and the melt blown fibers digested in 0.5 N. caustic solution at 55° C. for 5 hours. The procedures of Example No. 1 were used to produce a white, fiber containing 1.06 wt. % nitrogen. This corresponded to a about 34% conversion to the biocidal quat form, and represented a complete interchange of the available sodium groups for dimethyldidecylammonium cation groups. The fiber obtained corresponds to a composition containing 27.3 wt. % dimethyldidecylammonium acrylate.

EXAMPLE 3

A. Preparation of Biocidal Particles from Hammermill Ground Fiber

An ethylene-acrylic acid copolymer (300 melt index/20 wt. % AA) was extruded at 92° C. into strand, and then ground chopped into particles.

The particles were placed in a digestion bath containing 2 wt. % caustic heated to 55° C. and allowed to digest for 5 hours. The particles were removed and thoroughly washed with water.

A 12.0 gram portion of the particles was placed in a 100 ml. burette and rinsed thoroughly with water by pumping 2 liters of purge water slowly through the particle bed. A white, fibrous bed of about 11 inches bed depth was obtained.

A 500 ml. portion of solution containing 5.0 wt. % of dimethyldidecylammonium chloride was recirculated through the bed for six hours at a flow rate of 30 bed volumes per hour.

After the six hour reaction period, the bed was drained and thoroughly washed with 3 liters of deionized water and then further rinsed by recycling four hours with water to remove any trace chemicals. The product was removed from the column and air dried. Nitrogen analysis of the sample showed 0.49 wt. % nitrogen (corresponding to about 15% conversion to the biocidal quat form).

B. The particles were tested for biocidal activity and it was observed that addition of small amounts of the particles to agar gave complete kill to the four test organisms of Examples 1.

EXAMPLE 4

A flexible reinforced polyurethane foam was prepared by mixing in a quart (0.95 l) size paper cup 100 parts by weight (pbw) of a polyether triol having an average molecular weight of about 3000 commercially available from The Dow Chemical Company as Voranol 3137. 4.3 pbw water, 1.2 parts of L-540, a silicone surfactant commercially available from Union Carbide Corp., and Dabco 33 LV a mixture of 33% by weight of triethylenediamine in dipropylene glycol commercially available from Air Products Co. Then a separate mixture of 1.715 parts of stannous octoate catalyst and 45.2 ml of an 80/20 mixture of 2,4-/2,6-toluenediisocyanate are stirred with the polyol-containing mixture in a one-half gallon (1.89 l) cardboard cup. Stirring was stopped when the reaction started. The resultant mixture foamed and filled a cup containing 1 part by weight of the fibers of Example 1 to give a flexible foam with reinforcing and biocidal fibers covering the outside surface.

EXAMPLE 5

The procedure of Example 4 was followed except that 5 parts of the biocidal fibers of Example 1 and 5 parts of the biocidal particles of Example 3 were utilized. Also, the reaction mixture was continuously mixed when the reaction started.

The addition of biocidal particles or platelets improves biocidal killing characteristics without any substantial loss in foam properties.

In the following examples, a plurality of foams are prepared under varying conditions. In each case, the polymer is heat plastified in an extruder substantially in the manner of U.S. Pat. No. 2,669,751 and a volatile fluid blowing agent injected into the heat plastified polymer stream. From the extruder the heat plastified gel is passed into a mixer, the mixer being a rotary mixer wherein a studded rotor is enclosed within a housing which has a studded internal surface which intermeshes with the studs on the rotor. The heat plastified gel from the extruder is fed into the end of the mixer and discharged from the remaining end, the flow being in a generally axial direction. From the mixer, the gel passes through coolers such as are described in U.S. Pat. No. 2,669,751 and from the coolers to a die which extrudes a generally rectangular board. After extrusion, a foam of an acceptable, density, cell size, compressive strength, water vapor permeability and thermal conductivity is obtained.

EXAMPLE 6

Polystyrene having a viscosity of 14 centipoises (measured as a 10 percent solution in toluene) is fed to an extruder at the rate of 541 parts by weight per hour together with a mixture of the fibers from Example 1 and the particles from Example 3 so as to amount to 20% of the resulting foam. The blowing agent consists of a 1:1 by weight mixture of methyl chloride and dichlorodifluoromethane which is injected into the heat plastified polymer prior to its entry to the mixer. A total feed of $20.3 \times 10^{-4}$ moles of blowing agent per gram of polystyrene is added as a nucleator. A stable fiber reinforced rectangular board is extruded at a temperature of 121.5 degrees Celsius having a cross-sectional dimensions of 2.25×24 inches. The fibers and particles were distributed fairly uniformly throughout the foam.

EXAMPLE 7

A polyol blend was prepared by blending 60 parts of a rigid polyol Varonol 360 (polyether triol, equivalent weight 155, hydroxyl number 359, and hydroxyl functionality of 4-6, Dow Chemical Co.), 10 parts of a flexible polyol, Pluracol 220 (polyether triol equivalent weight 2093, hydroxyl number 27, BASF Wyandotte Corp.) and 30 parts of an aromatic polyether polyol, Terate 202 (equivalent weight 126, hydroxyl number 315, and a hydroxyl functionality of two, Hercules, Inc.).

Into the polyol blend, 1 part of silicone surfactant, DC-193 (Dow Corning Corp.), 0.06 part of urethane catalyst Dabco R-8020 (Air Products), and 0.06 part of urethane catalyst T-12 (dibutyltin dilaurate), and methylene chloride as a blowing agent to give a density of about 39.7 lbs/cu. ft., were blended and then approximately one-half of the filler (54.9 parts trishydrated alumina (Hydrafil) and 27 parts of the particles of Example 3 was added into the blended substance to make Component-I.

Component-II was prepared by blending polymeric isocyanate PAPI 27, equivalent weight 133.3 (Dow) and the remainder of the filler. The isocyanate Index was 110.

The components I and II were weighed separately, mixed, and about 5 percent by weight of one-half inch long chopped fibers of Example 1 were added and stirred for about 25 seconds, and then charged into a mold and heated at 70° Celsius for 5 minutes.

The composite has its two opposed main surface layers reinforced by fiber strands arranged longitudinally. The content of continuous fiber stand in the composite was ten percent, based on the total weight. This product was made up of fiber stands (small bundles of monofilaments) bundled together to form a large bundle of about three-sixteenths of an inch in diameter and these stands were kept at one-fourth inch intervals center to center, just beneath both surfaces.

The foam as it came out of the mold had a thickness of 1.25 inches and a width of three inches and was cut into then inch lengths. The resulting product was suitable for use as a material of construction in lieu of wood but with improved resistance to mildew.

What is claimed is:

1. A foam structure having biocidal characteristics comprising a polymeric foam substrate having incorporated therein particles and/or fibers, said fibers and particles comprising a blend of a biocidal effective amount of a copolymer of an alpha olefin and an alpha, beta-ethylenically unsaturated carboxylic acid having at least one cationic biocidal agent ionically bonded thereto with a water insoluble thermoplastic material.

2. The foam structure of claim 1 wherein said foam substrate is selected from the group consisting of polyolefin, polystyrene, latex, polyurethane, and cellulose.

3. A rigid polyurethane board foam structure having biocidal characteristics comprising a polyurethane foam board having incorporated therein particles and/or fiber, said particles or fibers comprising a blend of a biocidal effective amount of a copolymer of alpha olefin and an alpha, beta-ethylenically unsaturated carboxylic acid having at least one cationic biocidal agent ionically bonded thereto with a water insoluble thermoplastic material.

* * * * *